US011376528B2

(12) United States Patent
Jainek

(10) Patent No.: US 11,376,528 B2
(45) Date of Patent: Jul. 5, 2022

(54) FILTER SYSTEM WITH NON-RETURN VALVE AND FILTER ELEMENT

(71) Applicant: MANN+HUMMEL GmbH, Ludwigsburg (DE)

(72) Inventor: Herbert Jainek, Heilbronn (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 53 days.

(21) Appl. No.: 16/907,941

(22) Filed: Jun. 22, 2020

(65) Prior Publication Data
US 2020/0384386 A1    Dec. 10, 2020

Related U.S. Application Data

(63) Continuation of application No. PCT/EP2018/081045, filed on Nov. 13, 2018.

(30) Foreign Application Priority Data

Dec. 22, 2017    (DE) .................. 102017012018.8

(51) Int. Cl.
*B01D 29/21*    (2006.01)
*B01D 35/153*   (2006.01)
*B01D 35/147*   (2006.01)
*B01D 35/30*    (2006.01)

(52) U.S. Cl.
CPC .......... *B01D 29/21* (2013.01); *B01D 35/153* (2013.01); *B01D 35/147* (2013.01); *B01D 35/30* (2013.01); *B01D 2201/0415* (2013.01); *B01D 2201/305* (2013.01); *B01D 2201/34* (2013.01)

(58) Field of Classification Search
CPC .... B01D 29/21; B01D 35/153; B01D 35/147; B01D 35/30; B01D 2201/291; B01D 2201/0415; B01D 2201/34; B01D 2201/347; B01D 2201/4046; B01D 2201/305
See application file for complete search history.

(56) References Cited

U.S. PATENT DOCUMENTS 2,750,047 A *    6/1956    Hasbrouck ............. B01D 29/41
                                                            210/343
10,150,064 B2    12/2018   Klein et al.
(Continued)

FOREIGN PATENT DOCUMENTS

| DE | 102009056973 A1 | 6/2011 |
| EP | 2316556 A1 | 5/2011 |
| WO | 2012025640 A1 | 3/2012 |

*Primary Examiner* — Waqaas Ali

(57) ABSTRACT

A filter system for filtering a fluid has a filter housing with a housing top part and a housing bottom part, wherein the housing top part and the housing bottom part extend along a housing axis. An outlet socket is arranged at the housing top part and is provided to discharge the fluid after having been filtered. A non-return valve is arranged in an interior of the outlet socket. A filter element is arranged in the filter housing and separates a raw fluid side and a clean fluid side from each other. The filter element has a valve seat interacting with the non-return valve. The non-return valve closes in a closed position of the non-return valve a fluid path through the outlet socket and opens in an open position of the non-return valve the fluid path through the outlet socket.

16 Claims, 7 Drawing Sheets

(56) References Cited

U.S. PATENT DOCUMENTS

| | | | |
|---|---|---|---|
| 2001/0035376 A1* | 11/2001 | Dworatzek | F01M 11/03 210/440 |
| 2006/0157394 A1 | 7/2006 | Luka et al. | |
| 2009/0314697 A1 | 12/2009 | Ardes | |
| 2013/0270162 A1 | 10/2013 | Ardes | |

* cited by examiner

FILTER SYSTEM WITH NON-RETURN VALVE AND FILTER ELEMENT

CROSS-REFERENCE TO RELATED APPLICATIONS

This application is a continuation application of international application No. PCT/EP2018/081045 having an international filing date of 13 Nov. 2018 and designating the United States, the international application claiming a priority date of 22 Dec. 2017 based on prior filed German patent application No. 10 2017 012 018.8, the entire contents of the aforesaid international application and the aforesaid German patent application being incorporated herein by reference.

BACKGROUND OF THE INVENTION

The invention concerns a filter system with a non-return valve, in particular as an oil filter of an internal combustion engine, as well as a non-return valve and a filter element for such a filter system.

DE 10 2015 103 662 A1 discloses a filter with a filter housing, with a housing cover that closes the filter housing in operation and is removable from the filter housing, with an inlet for liquid to be filtered and with an outlet for filtered liquid. Furthermore, DE 10 2015 103 662 A1 discloses an exchangeable filter insert, separating a raw side and a clean side of the filter from each other, with a filter bypass valve that is comprised of a valve seat and a valve body that is movably guided relative thereto and prestressed by a force acting in valve closure direction. The valve seat is arranged in or at the housing cover and fixed at the cover, wherein the valve body is guided in or at the housing cover and fixed at the cover, and wherein a spring loading the valve body in the valve closure direction is guided in or at the housing cover and fixed at the cover. The filter insert comprises a spring support. In the state of the filter insert mounted in the filter and with the housing cover attached to the filter housing, the spring is supported and pretensioned by means of the spring support at its end which is facing away from the valve body.

SUMMARY OF THE INVENTION

An object of the invention is to create a filter system with a non-return valve, in particular an oil filter of an internal combustion engine, wherein the non-return valve reduces a possible drop of the oil level in an oil circuit at low oil pressure or when the internal combustion engine is not operating and wherein the non-return valve can be inexpensively mounted.

Further objects of the invention are to provide a non-return valve for such a filter system as well as a filter element for such a filter system with a non-return valve.

The aforementioned object is solved according to an aspect of the invention by a filter system for filtering a fluid, comprising a filter housing with a housing top part and a housing bottom part which extend along a housing axis, an outlet socket arranged at the housing top part for discharging the filtered fluid, a non-return valve which is arranged in the interior of the outlet socket, a filter element that separates a raw fluid side from a clean fluid side, wherein the filter element comprises a valve seat for the non-return valve, and wherein the non-return valve closes in a closed position a fluid path through the outlet socket and opens in an open position the fluid path through the outlet socket.

A further object is solved according to an aspect of the invention by a non-return valve for use in a filter system with a filter element, wherein the non-return valve, which is arranged in the filter system in the interior of an outlet socket of the filter system, acts with a closure element that is supported by a spring element against a valve seat upon intended installation of a matching filter element, wherein the valve seat is formed at or in the filter element. Only when using a matching filter element, in particular matching in length, the filter element with the valve seat formed thereat can interact with the non-return valve so that a drop of the fluid pressure, for example, when turning off the internal combustion engine, is prevented. Upon removal of the filter element, the non-return valve is leaking so that fluid drainage is possible even from the clean region when servicing the filter element.

A further object according to an aspect of the invention is solved by a filter element for use in a filter system, with a longitudinal axis, comprising a filter bellows arranged about the longitudinal axis, wherein the filter element comprises a socket with an opening for draining the filtered fluid from the interior of the filter bellows, wherein the socket is embodied as a valve seat of a non-return valve.

Beneficial configurations and advantages of the invention result from the further claims, the description, and the drawing.

A filter system for filtering a fluid, in particular as an oil filter of an internal combustion engine, is proposed, comprising a filter housing with a housing top part and a housing bottom part which extend along a housing axis, an outlet socket arranged at the housing top part for discharging the filtered fluid, a non-return valve which is arranged in the interior of the outlet socket, and a filter element that separates a raw fluid side from a clean fluid side. The filter element comprises a valve seat for the non-return valve. In this context, the non-return valve closes in a closed position a fluid path through the outlet socket and opens in an open position the fluid path through the outlet socket.

At the clean side of the filter system according to the invention, a non-return valve is arranged which closes in a closed position the fluid path through the outlet socket and opens in an open position the fluid path through the outlet socket. This is in particular advantageous for a suspended filter system. In a suspended filter system, the housing top part is fixedly mounted, for example, and the filter element can be separated together with the housing bottom part from the housing top part. When such a filter system is used, for example, as an oil filter system in an internal combustion engine, the oil level does not drop when the motor is standing still because the non-return valve prevents the return of the oil into the filter element. Furthermore, the oil pressure is built up faster when restarting the engine. Advantageously, in a service situation in which the filter element is to be removed or exchanged, the non-return valve is not completely seal-tight so that, despite the presence of non-return valve, the oil column can drain through the non-return valve. In this way, more used oil can be removed and replaced with new oil when exchanging the filter element.

When the filter element is inserted into the filter housing, the closure element of the non-return valve is pressed seal-tightly by a spring element against the opening in the end disc, for example, the socket of the central tube in the filter element. In this way, the non-return valve is in its closed position and the fluid path through the outlet socket of the filter housing is closed. With increasing oil pressure buildup, the closure element of the non-return valve can be lifted off its valve seat by the fluid pressure and open the opening in the outlet socket in this way. The outlet socket can advantageously be arranged concentrically to the housing axis in order to enable simple mounting of the filter element without precise rotatory positioning.

When the filter element is removed, the closure element, e.g. a disc, is resting captively on the valve holder which is embodied, for example, as a retaining ring. By means of spacer segments and penetrations arranged therebetween, for example, leakage openings, the closure element is not resting completely seal-tightly on the valve holder. In this context, the valve seat, on which the closure element is resting when the filter element is inserted, is arranged in the filter element, for example, at the socket of the central tube. In this way, the actual functionality of a non-return valve can be realized. In the installed state, the socket of the filter element projects into the valve holder and past it. In this way, the closure element can contact seal-tightly the socket without or with minimal fluid pressure. A seal between the socket of the filter element and the outlet socket prevents leakage of the fluid when the filter element is installed.

The non-return valve enables in this way advantageously a retaining function of the oil circuit for fast lubrication of the internal combustion engine when restarting it. An optimal oil discharge with beneficial discharged oil volume, i.e., as large as possible, contributes further to the advantages of the filter system with non-return valve according to the invention.

According to an advantageous embodiment, the filter element can comprise a filter bellows arranged about its longitudinal axis. The filter element can comprise furthermore a socket with an opening in a longitudinal axis of the filter element for discharging the filtered fluid from the interior of the filter bellows. In this context, the socket can advantageously be embodied as a valve seat, in particular, the socket can be provided additionally also as an actuating element. Upon insertion of the filter element into the filter housing top part, wherein the filter element can be connected to the filter housing bottom part, for example, detachably, for example, locked, the socket of the filter element can lift in this context the closure element of the non-return valve out of its initial position. Since the socket is embodied as a valve seat and the closure element is pushed by the spring element against the valve seat, the non-return valve is thus in its closed position. Increasing fluid pressure counteracts the spring element so that the closure element can be lifted off its valve seat and open the opening of the outlet socket at least partially.

The socket of the filter element can have a central opening as a valve seat which can comprise a circular cross section for manufacture-technological reasons and for a better sealing action.

According to an advantageous embodiment, the non-return valve can comprise a closure element and a spring element, wherein the spring element is supported at the housing top part. In particular, the spring element can be clamped between closure element and housing top part in this context. The spring element pushes in this way the closure element against the sealing valve seat so that the non-return valve is in its closed position and the fluid path through the outlet socket is blocked. The spring element in this context can expediently rest and be supported with one end against the housing top part. When the spring force is overcome, the closure element can lift off its valve seat and in this way open the fluid path through the outlet socket.

According to an advantageous embodiment, the filter bellows can comprise at least a first end disc at a first end face, which end disc comprises an opening for receiving a central tube in the interior of the filter bellows, wherein the socket with the valve seat is embodied at an end of the central tube which is facing the end disc. When being filtered, the fluid flows from a radial outward position through the filter bellows into the interior of the filter bellows. The central tube in the interior of the filter bellows serves in this context for radially supporting the filter bellows against the hydraulic pressure of the fluid during filtering. The central tube, which can be constructed, for example, as a plastic tube with penetrations and stays, can be embodied as a socket in the direction of the outlet socket. This socket can advantageously serve as a valve seat for the non-return valve against which the closure element in the closed state of the non-return valve is resting seal-tightly. The socket, upon insertion of the filter element into the filter housing, can lift the closure element out of its initial position in which the closure element is resting against the valve holder.

According to an advantageous embodiment, the non-return valve, in the removed state of the filter element, can be designed to allow for leakage. Expediently, the non-return valve, in the removed state of the filter element in which the non-return valve is in its initial position, can exhibit leakage so that upon exchange of the filter element as much fluid as possible can drain from the fluid circuit.

According to an advantageous embodiment, in the interior of the outlet socket a valve holder can be arranged on which the closure element is resting in the removed state of the filter element. In particular, in the installed state of the filter element, the socket of the filter element can project through the valve holder. The valve holder serves as support of the closure element of the non-return valve which is pretensioned by the spring element. In this way, the non-return valve can be held in its initial position until the filter element is inserted into the filter housing and the closure element is lifted off the valve holder by the socket of the central tube, which projects through the valve holder, and is pushed against the valve seat formed on the socket. The valve holder serves also as an attachment of the non-return valve in the outlet socket in that it is supported against the wall of the outlet socket, for example.

According to an advantageous embodiment, leakage openings can be formed between closure element and valve holder. In particular, in this context the valve holder can have radially inwardly projecting stays on which the closure element is resting in the removed state of the filter element. The leakage openings can be embodied in this context between the stays, for example. Upon exchange of the filter element, when the closure element is again resting on the valve holder, the fluid can drain through the leakage openings so that the fluid circuit can be emptied therethrough. For this purpose, expediently the diameter of the socket is selected such that the leakage openings are located outside of the diameter of the socket. In the installed state at low fluid pressure, the non-return valve is closed and is open only when sufficient fluid pressure is present. With the filter element removed, the non-return valve is embodied to allow for leakage in a targeted fashion due to the leakage openings.

According to an advantageous embodiment, the valve holder can be embodied as a bent sheet metal part which can be clamped in the outlet socket in radial direction. A bent sheet metal part can be inexpensively produced with suitable tolerance dimensions. Also, in this way, claws can be provided beneficially at the radially outer side of the valve holder with which the valve holder upon insertion into the outlet socket can dig into the wall of the outlet socket and can be safely secured in this way by radial bracing.

According to an advantageous embodiment, the non-return valve can comprise a valve housing which is arranged in the interior of the outlet socket and/or at the valve holder and at which the spring element is supported. The spring element can thus be supported at an end of the valve housing in a suitable way whereby the force can be transmitted via the valve housing to the outlet socket and thus to the filter housing top part. Alternatively, the valve housing can also be connected to the valve holder. When this valve holder is fixed at the filter housing, the spring force can thus be transmitted to the filter housing so that the spring element is supported at the filter housing.

According to an advantageous embodiment, the valve housing and the valve holder are connectable to each other, in particular embodied together as one piece. Due to the embodiment of a joined unit of valve housing and valve holder, mounting of the non-return valve in the outlet socket can be simplified as a whole. Also, with a one-piece configuration of valve housing and valve holder, a particularly inexpensive unit can be created. Advantageously, the non-return valve can be embodied in this way as a preassembled unit which allows for beneficial organization of assembly times and costs of the filter system.

According to an advantageous embodiment, the filter element can be embodied to be insertable with its central tube at least partially into the outlet socket wherein the outlet socket is configured to be sealed relative to the opening of the end disc and/or relative to the central tube, in particular wherein the socket of the central tube is sealed at its outer side against the outlet socket. By sealing the outlet socket relative to the opening of the end disc and/or relative to the central tube, it can be achieved that the filtered fluid can flow completely through the outlet socket out of the filter element. In this way, the advantageous function of the non-return valve can also be utilized beneficially because no auxiliary fluid paths between filter element and outlet socket are possible.

According to an advantageous embodiment, the central tube at the end that is oppositely positioned to the central opening can comprise a closure element which is configured to be connectable to the housing bottom part. The central tube can advantageously be seal-tightly closed off at the other end so that the filtered fluid drains completely through the outlet socket. In this context, the closure element can be utilized expediently for connecting to the housing bottom part, for example, by locking. In this way, a beneficial releasable connection between filter element and housing bottom part can be realized also.

According to a further aspect, the invention concerns a non-return valve for use in a filter system with a filter element. The non-return valve, when mounted as intended in the filter system, is arranged in the interior of an outlet socket of the filter system, with a closure element supported against a valve seat by a spring element. In this context, the valve seat is embodied at or in the filter element.

The non-return valve enables thus advantageously a retaining function of the oil circuit for quick lubrication of the internal combustion engine when restarting. An optimal oil drainage with beneficial draining oil volume, namely as large as possible, contributes further to the advantages of the filter system with non-return valve according to the invention.

According to a further aspect, the invention concerns a filter element for use in a filter system, with a longitudinal axis, comprising a filter bellows arranged about the longitudinal axis. In this context, the filter element comprises a socket with an opening for draining the filtered fluid from the interior of the filter bellows, wherein the socket is configured as a valve seat of a non-return valve.

When the filter element is inserted into the filter housing, the closure element of the non-return valve is pushed seal-tightly against the opening in the end disc, for example, a socket of the central tube in the filter element, by means of the spring element. In this way, the non-return valve is in its closed position and the fluid path through the outlet socket of the filter housing is closed. With increasing oil pressure buildup, the closure element of the non-return valve can be lifted by the fluid pressure off its valve seat and in this way open the opening in the outlet socket.

According to an advantageous embodiment, the filter bellows can comprise at least a first end disc at a first end face, which end disc comprises an opening for receiving a central tube in the interior of the filter element. In this context, the socket with the valve seat is formed at an end of the central tube facing the end disc.

When filtering, the fluid flows from a radially outward position through the filter bellows into the interior of the filter bellows. The central tube in the interior of the filter bellows serves in this context for reinforcement of the filter bellows against the hydraulic pressure of the fluid during filtering. The central tube, that can be configured, for example, as a plastic tube with penetrations and stays, can be embodied as a socket in the direction of the outlet socket. This socket can advantageously serve as a valve seat for the non-return valve on which the closure element of the non-return valve is seal-tightly resting in the closed state of the non-return valve. The socket of the filter element, upon insertion of the filter element into the filter housing, can lift the closure element of the non-return valve out of its initial position in which the closure element is resting on a valve holder.

BRIEF DESCRIPTION OF THE DRAWINGS

Further advantages result from the following drawing description. In the drawings, embodiments of the invention are illustrated. The drawings, description, and the claims contain numerous features in combination. A person of skill in the art will consider the features also expediently individually and combine them to expedient further combinations.

DESCRIPTION OF PREFERRED EMBODIMENTS

Figure 1:
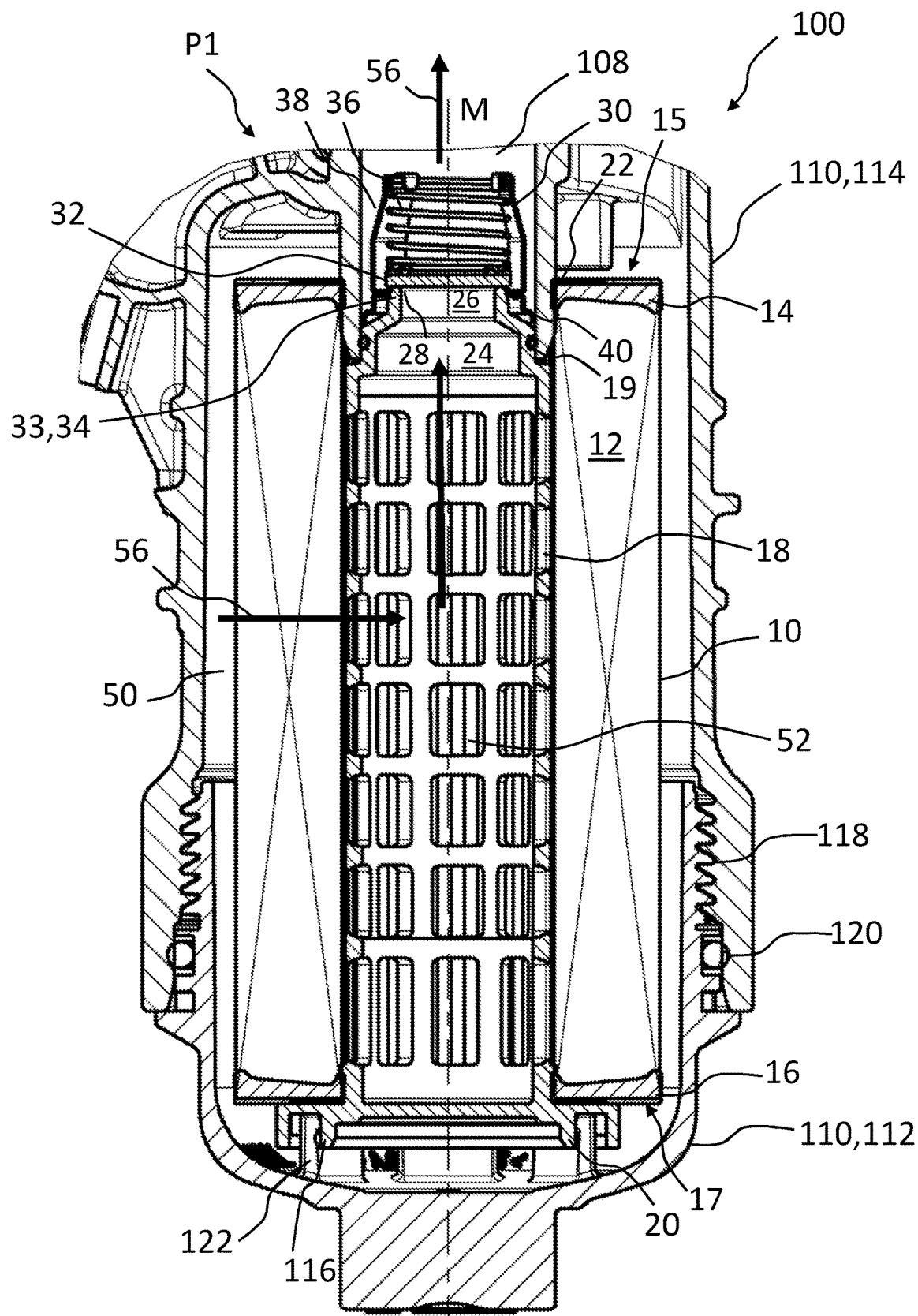
FIG. 1 shows a longitudinal section through a filter system according to an embodiment of the invention with a non-return valve in a closed position.

In the Figures, same or same-type components are identified with same reference characters. The Figures show only examples and are not to be understood as limiting.

FIG. 1 shows a longitudinal section of a filter system 100 for filtering a fluid, in particular as an oil filter of an internal combustion engine, according to an embodiment of the invention with a non-return valve 30 in a closed position P1. The filter system 100 comprises a filter housing 110 with a housing top part 114 and a housing bottom part 112 that extend along a housing axis M. At the housing top part 114, an outlet socket 108 for discharging the filtered fluid is arranged which can be connected, for example, to an oil circuit of an internal combustion engine.

In the interior of the outlet socket 108, a non-return valve 30 is arranged. The non-return valve 30 comprises a closure element 32 and a spring element 36. The spring element 30 is supported at the housing top part 114, in particular, the spring element 30 is clamped between closure element 32 and housing part 114. The non-return valve 30 closes in a closed position P1 a fluid path 56 through the outlet socket 108 and in an open position P2 opens the fluid path 56 through the outlet socket 108.

A filter element 10 that is arranged in the interior of the filter housing 110 separates a raw fluid side 50 from a clean fluid side 52. The filter element 10 comprises a filter bellows 12 which is arranged about its longitudinal axis L. The filter bellows 12 is flowed through by the fluid in a radial direction from the exterior to the interior. The fluid path 56 is illustrated by arrows. The filter bellows 12 comprises a first end disc 14 at a first end face 15 which comprises an opening 22 for receiving a central tube 18 in the interior 24 of the filter bellows 12. The socket 28 is formed at the end of the central tube 18 which is facing the end disc 14. The socket 28 with an opening 26 is arranged in the longitudinal axis L of the filter element 10 and serves for discharging the filtered fluid from the interior 24 of the filter bellows 12. The socket 28 is embodied as a valve seat 34 and is provided furthermore as an actuating element 33 for lifting the non-return valve 30. In this context, the non-return valve 30 is closed until a sufficient fluid pressure is built up which can lift the closure element 32 off the valve seat. When inserting the filter element 10 into the filter housing top part 114, the socket 28 which projects through the valve holder 40, lifts the closure element 32 of the non-return valve 30 out of its initial position on the valve holder 40. In this way, the non-return valve 30 is initially in its closed position P1.

The filter element 10 is embodied to be insertable with its central tube 18 at least partially into the outlet socket 108. The outlet socket 108 is embodied to be sealable relative to the opening 22 of the end disc 14 and relative to the central tube 18. In particular, the socket 28 is sealed at its outer side by the circumferential seal 19, for example, an O-ring seal, against the outlet socket 108.

Housing top part 114 and housing bottom part 112 of the filter housing 110 are connected to each other by a screw thread 118. Both housing parts 112, 114 are sealed by a circumferential seal 120, for example, an O-ring seal, relative to the environment. At the end which is positioned opposite the central opening 26, the central tube 18 of the filter element 10 comprises a closure element 20 which closes a central opening of the end disk 16. An axially outer face of the closure element 20 having an annular groove (see FIG. 3) which is embodied to engage an axially projecting centering part 122 forming a locking arrangement 116 (see FIG. 1) locking the central tube 18 to the housing bottom part 112. The filter element 10 is seal-tightly closed by the closure element 20 at the lower end. The filter element 10 can be placed with the closure element 20 onto a centering part 122 arranged in the housing bottom part 112 and can be connected, for example, by a locking arrangement 116, to the centering part 122. In this way, the filter element 10 can be inserted with the housing bottom part 112 into the housing top part 114 and the filter housing 110 can be seal-tightly closed by screwing the housing bottom part 112 to the housing top part 114.

By inserting the filter element 10 into the housing top part 114, the closure element 32 of the non-return valve 30 will contact the socket 28 of the central tube 18 and thus the valve seat 34 whereby the fluid path 56 through the outlet socket 108 is closed and can be opened only by building up a corresponding hydraulic pressure of the fluid.

Figure 6:
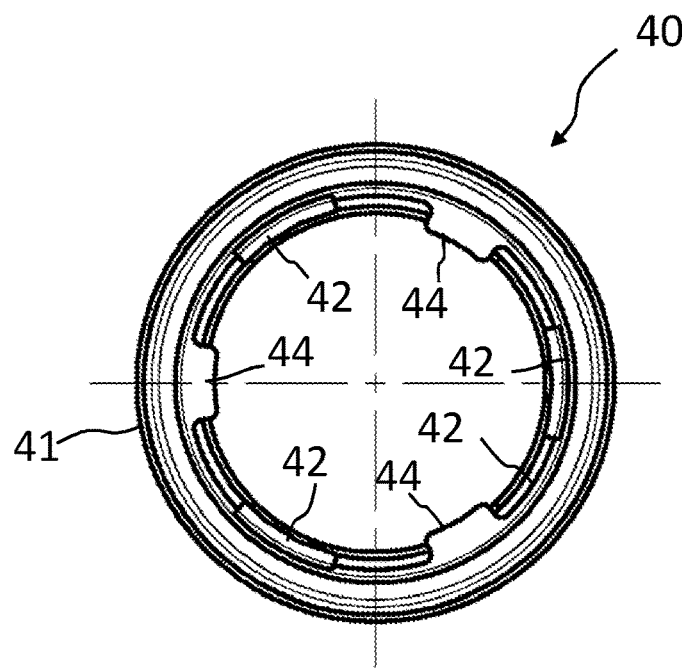
FIG. 6 shows a plan view of the valve holder.

By releasing the screw connection (screw threads 118), the filter element 10 with the housing bottom part 112 can be pulled out of the filter housing 110 again. In this way, the socket 28 is removed from the closure element 32. The closure element 32 thus rests again against the valve holder 40. Fluid can flow through the leakage openings 42 in the valve holder 40, as illustrated in FIG. 6, past the closure element 32 and the fluid circuit can thus be emptied via the outlet socket 108.

The filter element 10 can be released with an appropriate force from the locking action with the centering part 122. A new filter element 10 can then be inserted into the housing bottom part 112.

Figure 2:
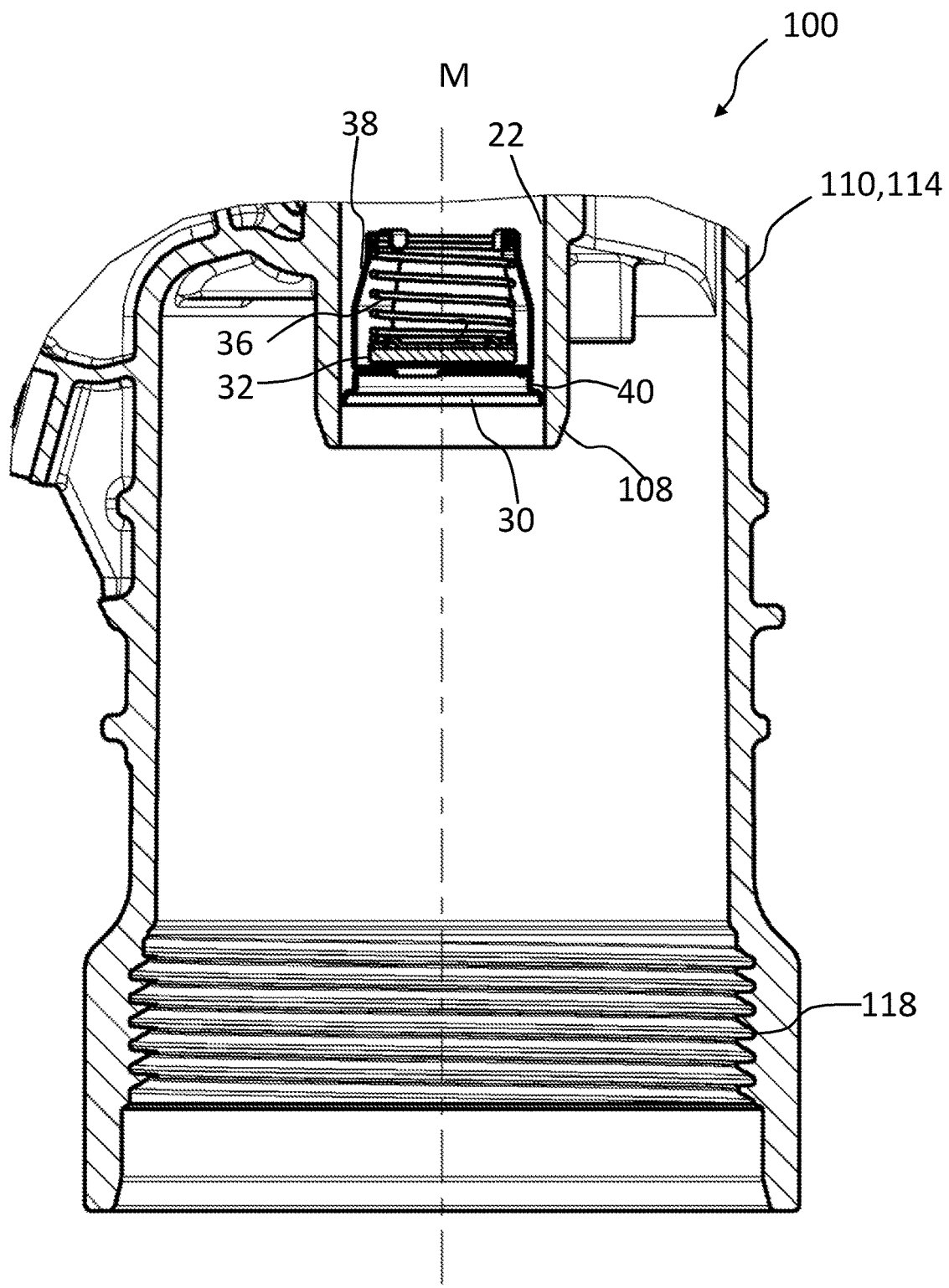
FIG. 2 shows a longitudinal section of the filter housing top part of the filter system in FIG. 1 with the non-return valve in an initial position.

In this regard, a longitudinal section through the filter housing top part 114 of the filter system 100 in FIG. 1 is illustrated in FIG. 2, with the non-return valve 30 in an initial position without filter element 10. The non-return valve 30 is arranged in the interior of the outlet socket 108. The non-return valve 30 comprises a valve housing 38 with a spring element 36 and a closure element 32. At the open end of the valve housing 38, a valve holder 40 is arranged on which the closure element 32 is resting in the initial position in the state when the filter element 10 is removed from the housing top part 114. The closure element 32 is forced for this purpose by the spring element 36, which is supported at the valve housing 38, against the valve holder 40. The valve housing 38 is connected to the valve holder 40. Since the valve holder 40 is connected to the outlet socket 108, the spring element 36 as a whole is supported at the housing top part 114.

The housing top part 114 comprises a screw thread 118 for closing the filter housing 110 with the housing bottom part 112.

Figure 3:
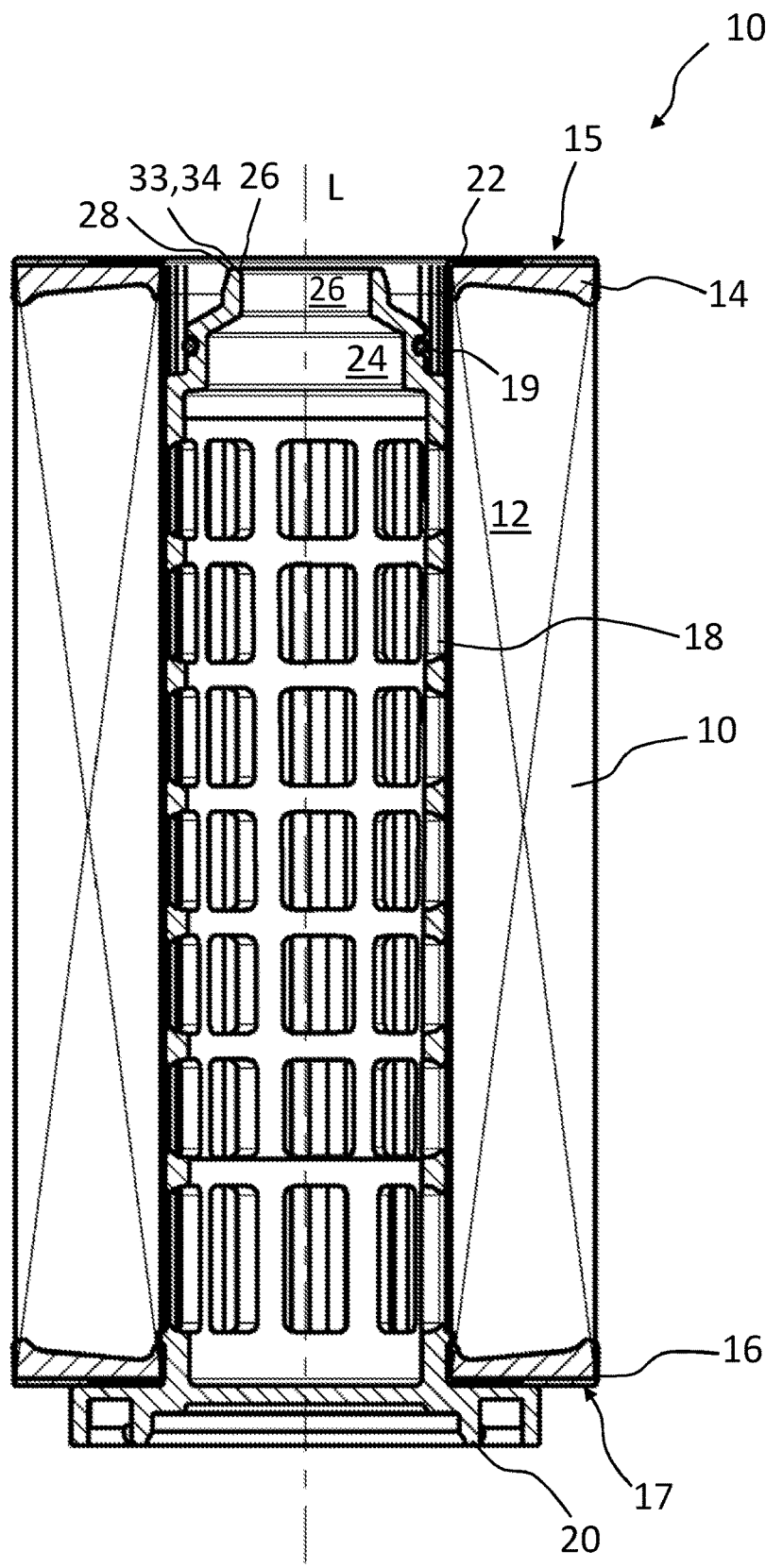
FIG. 3 shows a longitudinal section of the filter element of the filter system in FIG. 1.

FIG. 3 shows a longitudinal section through the filter element 10 of the filter system 100 in FIG. 1. The filter element 10 comprises a filter bellows 12 which is arranged about a longitudinal axis L. The filter bellows 12 is seal-tightly closed at its two end faces 15, 17 by end discs 14, 16. The end disc 14 comprises an opening 22 for receiving a central tube 18 in the interior 24 of the filter element as a reinforcement of the filter bellows 12 against the hydraulic pressure of the fluid. The central tube 18 is seal-tightly closed at the lower end face 17 with a closure element 20. With this closure element 20, the filter element 10 can be connected by a centering part 122 to the housing bottom part 112. The central tube 18 tapers at its upper end, which is facing the end disc 14, into a socket 28 with an opening 26 which serves for discharging the filtered fluid out of the interior 24 of the filter bellows 12. At the outer side of the socket 28, a circumferential seal 19 is arranged for sealing against the outlet socket 108 upon insertion of the filter element 10 into the housing top part 114. The socket 28 serves with its tapering end, which is embodied so as to point away from the central tube 18, as an actuating element 33 and as a valve seat 34 of the non-return valve 30.

Figure 4:
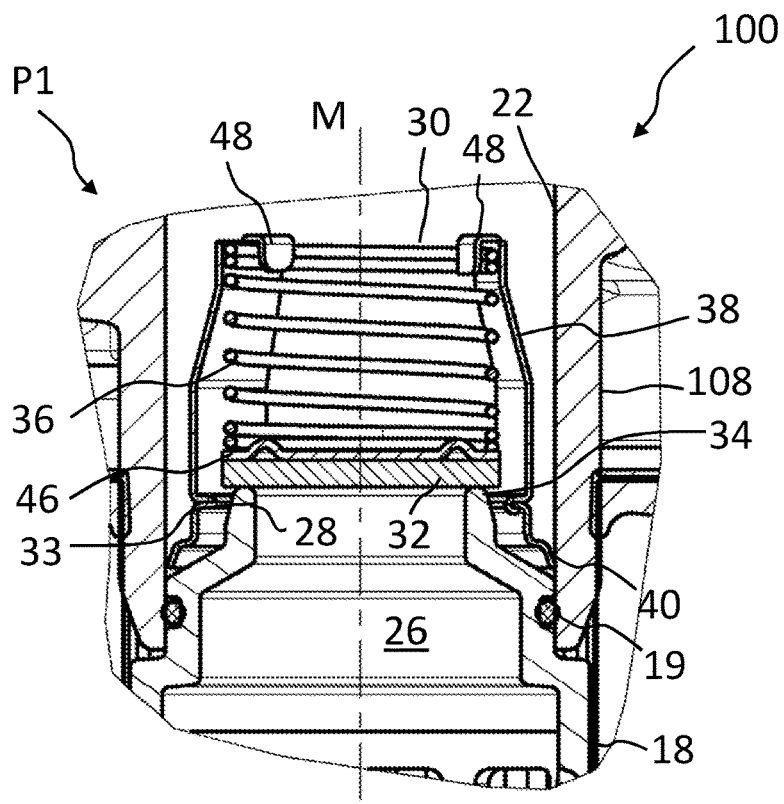
FIG. 4 shows an enlarged detail of the filter system according to FIG. 1 with focus on the non-return valve in a closed position.
Figure 5:
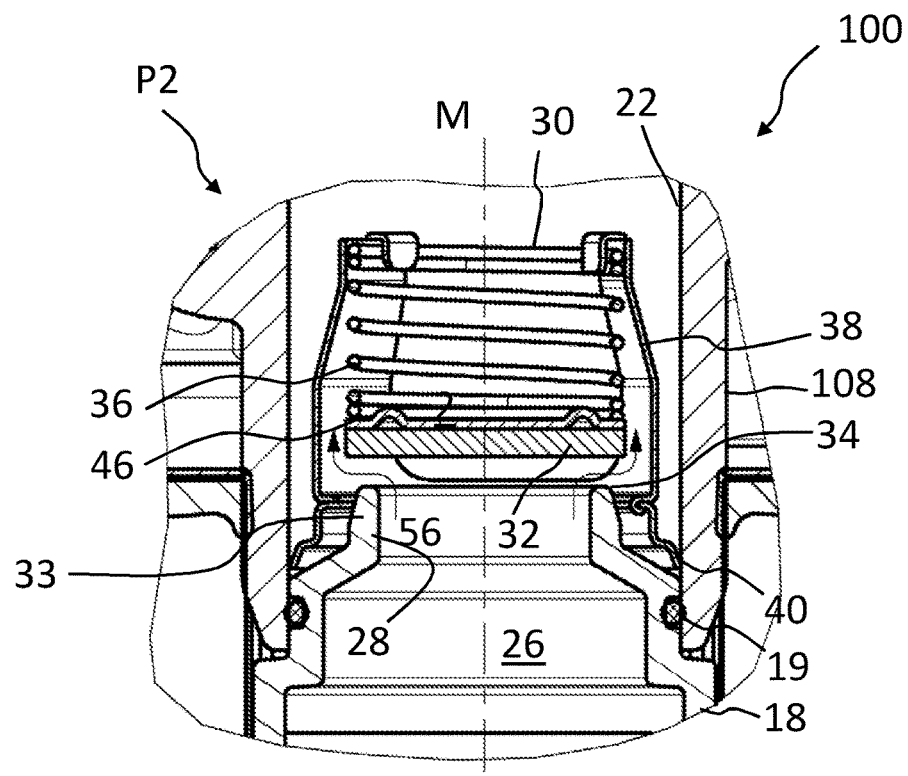
FIG. 5 shows an enlarged detail of the filter system according to FIG. 1 with focus on the non-return valve in an open position.

In FIGS. 4 and 5, in an enlarged detail of a part of the filter system 100 according to FIG. 1, the non-return valve 30 is illustrated in a closed position P1 (FIG. 4) as well as in an open position P2 (FIG. 5). The non-return valve 30 is arranged in the interior of the outlet socket 108. The non-return valve 30 comprises the valve housing 38 with a spring element 36 and a closure element 32. The closure element 32, which is embodied, for example, as a rubber plate, is reinforced by a reinforcement element 46 that is arranged between closure element 32 and spring element 36. The reinforcement element 46 can be embodied, for example, as an embossed sheet metal part. The spring element 36 is secured at one end by the valve housing 38 by means of crimped tabs 48 and can thus be supported at the valve housing 38. The other end of the spring element 36 pushes via the reinforcement element 46 on the closure element 32.

At the open end of the valve housing 38, a valve holder 40 is arranged on which the closure element 32 is resting in an initial position when the filter element 10 is in the state removed from the housing top part 114. The valve housing 38 is connected to the valve holder 40. Since the valve holder 40 is connected to the housing top part 114, in particular dug into it, the spring element 36 can be supported as a whole on the housing top part 114.

The filter element 10 is inserted into the housing top part 114 with the housing bottom part 112, which is not illustrated in the illustrated detail view, so that the socket 28 of the central tube 18 of the filter element 10 engages the outlet socket 108 of the housing top part 114. The socket 28 of the central tube 18 projects for this purpose through the valve holder 40. The socket 28 is sealed against the outlet socket 108 by means of the circumferential seal 19. The socket 28 pushes as actuating element 33 with the valve seat 34 against the closure element 32 of the non-return valve 30. In this context, the non-return valve 30 is closed until a satisfactory fluid pressure lifts the closure element 32 off its valve seat 34 at the socket 28.

In FIG. 4, the non-return valve 30 is illustrated in the closed position P1 in which the closure element 32 is resting seal-tightly on the valve seat 34. In the installed state, the socket 28 of the filter element 10 projects into the valve holder 40 and past it. In this way, the socket 28 can rest seal-tightly against the closure element 32. The seal 19 prevents leakage of the fluid when the filter element 10 is installed.

In FIG. 5, the non-return valve 30 is illustrated in the open position P2. In the open position P2, the closure element 32 is lifted off the valve seat 34 because the force of the spring element 36, which is embodied as a soft spring, is overcome by the hydraulic pressure of the filtered fluid. The filtered fluid can thus flow about the closure element 32 into the outlet socket 108 and therefore out of the filter system 100.

FIG. 6 shows a plan view of the valve holder 40. The valve holder 40 can be embodied, for example, as a cropped bent sheet metal part which can be braced radially in the outlet socket 108. The valve holder 40 in the illustrated embodiment is of an annular configuration. The valve holder 40 can thus be pushed into the outlet socket 108 of the housing top part 114 and then digs with the cropped rim 41, which can be seen in FIG. 7 in the longitudinal section through the non-return valve 30, into the inner side of the outlet socket 108. In this way, the valve holder 40 can be fixedly secured in the outlet socket 108.

A plurality of webs 44 project from the outer rim 41 in radial direction inwardly. The closure element 32 is resting on these webs 44 in the initial position when the filter element 10 is not arranged in the housing top part 114. The closure element 32 is pushed by the spring element 38 against these webs 44. Leakage openings 42 are formed between the webs 44, respectively. These leakage openings 42 are thus formed between the closure element 32 and the valve holder 40 so that through them the fluid can drain again from the outlet socket 108 when the filter element 10 is removed and in this way the closure element 32 no longer rests seal-tightly against the valve seat 34 of the filter element 10. For this purpose, the diameter of the socket 28 is expediently selected such that the leakage openings 42 are located outside of the diameter of the socket 28. In this way, in the installed state at low fluid pressure, the non-return valve 30 is closed and is opened only at sufficient fluid pressure. When the filter element 10 is removed, the non-return valve 30 is embodied to allow for leakage due to of the leakage openings 42, and the oil circuit of an internal combustion engine can be emptied from the clean side.

Figure 7:
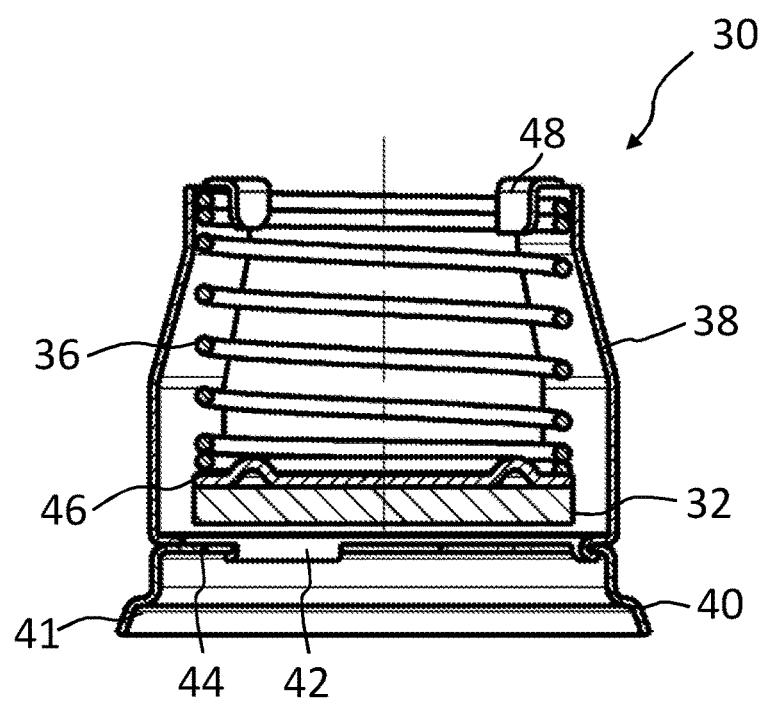
FIG. 7 shows a longitudinal section of the non-return valve in an initial position.

In FIG. 7, a longitudinal section through the non-return valve 30 in an initial position is illustrated. The non-return valve 30 comprises the valve housing 38 with a spring element 36 and a closure element 32. The closure element 32 that is embodied, for example, as a rubber plate is reinforced by a reinforcement element 46 that is arranged between closure element 32 and a spring element 36. The reinforcement element 46 can be embodied, for example, as an embossed sheet metal part.

The spring element 36 is held at one end by the valve housing 38 by means of crimped tabs 48 and can thus be supported at the valve housing 38. The other end of the spring element 36 presses via the reinforcement element 46 on the closure element 32.

At the open end of the valve housing 38, a valve holder 40 is arranged on which the closure element 32 is resting as initial position in the state when the filter element 10 is removed from the housing top part 114. The valve housing 38 is connected to the valve holder 40. Valve housing 38 and valve holder 40 can be embodied to be locked with each other or welded to each other, for example. In particular, valve housing 38 and valve holder 40 can also be embodied together as one piece.

Since the valve holder 40 is connected to the housing top part 114, in particular locked therein, the spring element 36 can be supported as a whole at the housing top part 114.

Figure 8:
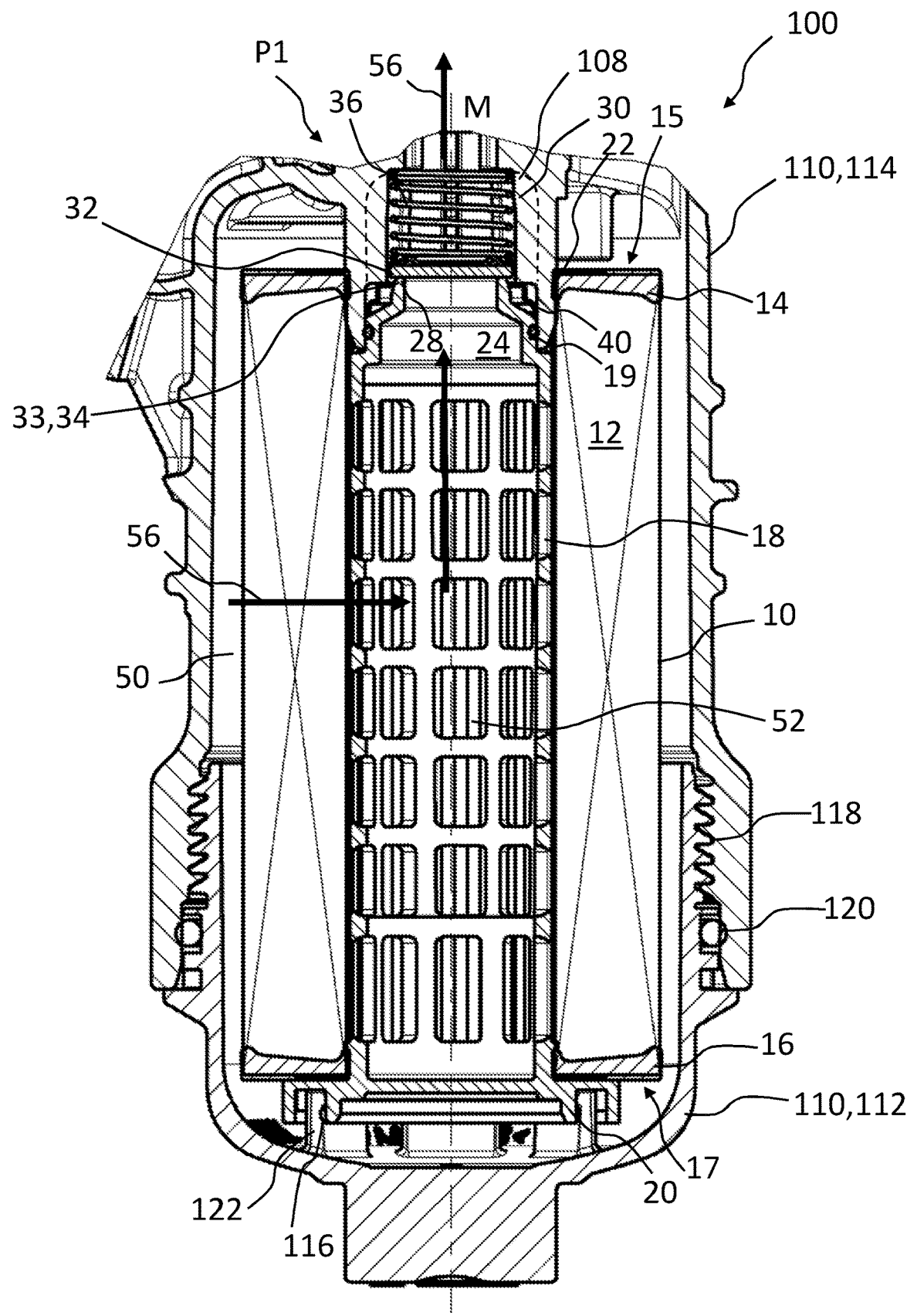
FIG. 8 shows a longitudinal section of a filter system according to a further embodiment of the invention with a non-return valve in a closed position.

FIG. 8 shows a longitudinal section through a filter system 100 according to a further embodiment of the invention with a return valve 30 in a closed position P1. For avoiding unnecessary repetitions, only the differences to the embodiment illustrated in FIG. 1 will be discussed.

The non-return valve 30 in the embodiment illustrated in FIG. 8 is arranged without its own valve housing in the interior of the outlet socket 108. This can be seen clearly in the two enlarged details in FIGS. 9 and 10. The non-return valve 30 is thus not embodied as a preassembled unit but is inserted with its individual components into the outlet socket 108. The spring element 36 is arranged directly in a step 109 of the outlet socket 108 and is supported at ribs, extending radially inwardly in the direction of the spring element, at this step 109 and thus at the housing top part 114. The fluid flows between the ribs past the spring element. A valve holder 40 is arranged in a similar manner as in the embodiment illustrated in FIG. 1 in the outlet socket 108. In this way, the closure element 32 can be resting also in the initial position without filter element 10 in a similar way as above at this valve holder 40. When the filter element 10 is pushed into the housing top part 114, the closure element 32 is lifted off the valve holder 40 by means of the socket 28 as actuating element 33. Thus, the non-return valve 30 is in the closed position P1.

Figure 9:
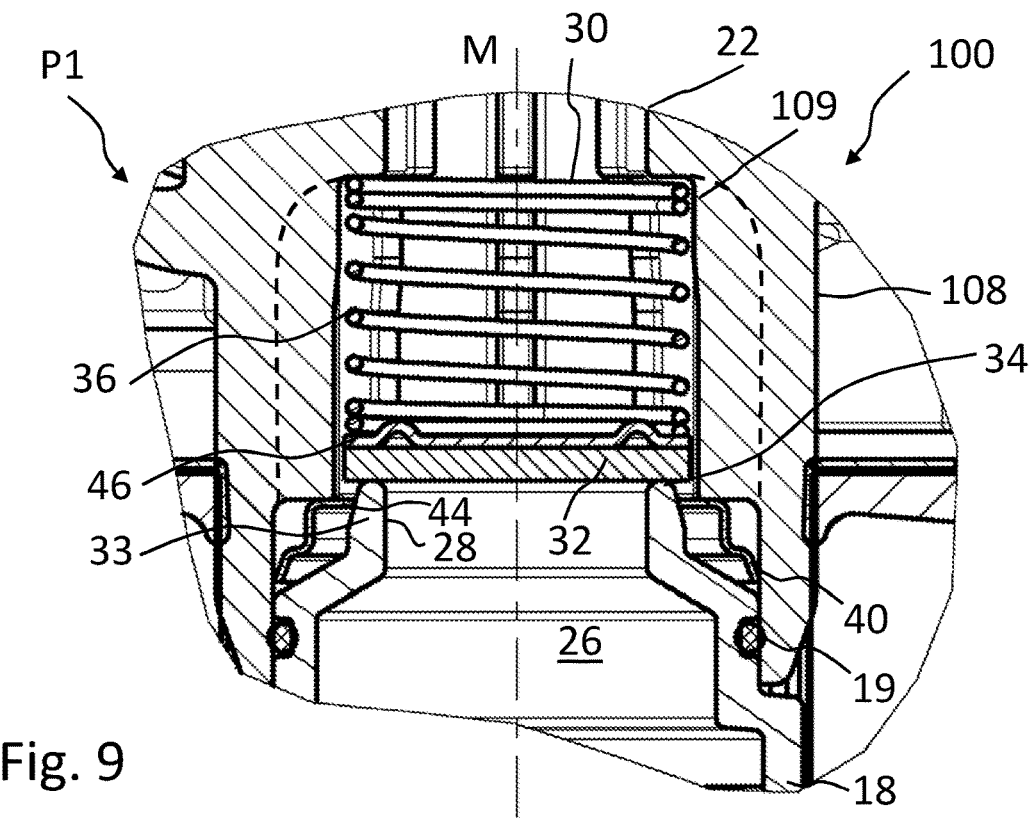
FIG. 9 shows an enlarged detail of the filter system according to FIG. 8 with focus on the non-return valve in a closed position.
Figure 10:
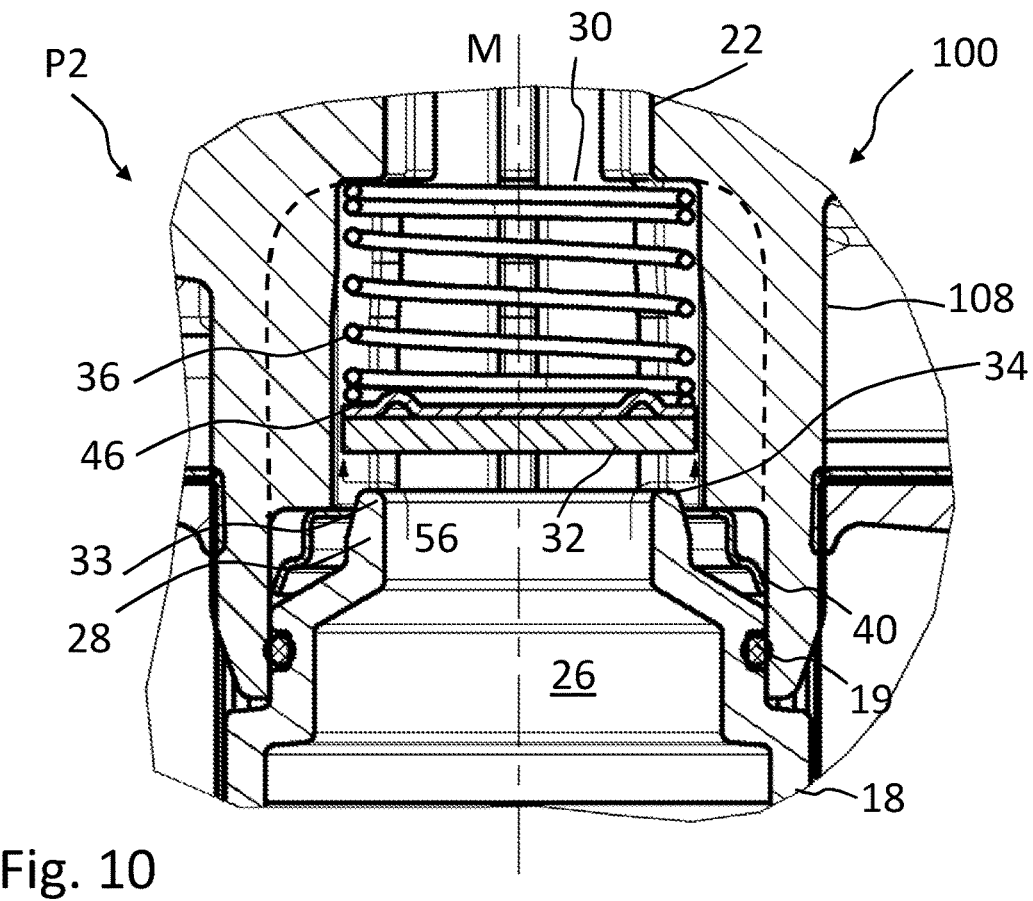
FIG. 10 shows an enlarged detail of the filter system according to FIG. 8 with focus on the non-return valve in an open position.

In the enlarged detail of FIG. 9 of the filter system 100 according to FIG. 8, the non-return valve 30 is illustrated in the closed position P1. It can be clearly seen that the spring element 36 is arranged in the step 109 of the outlet socket 108 and is supported at the step 109. The valve holder 40 is arranged at the beginning of the step 109 of the outlet socket, wherein the webs 44 project into the free opening of the step 109 so that the closure element 32 can rest on them when the filter element 10 is removed. Leakage openings 42 (not visible) are embodied (as can be seen in FIG. 6) between the webs 44 so that fluid from the outlet socket 108 can flow past the closure element 32 and the fluid circuit can be emptied in this way when the filter element 10 is removed.

In the enlarged detail of Fig. of the filter system 100, the non-return valve 30 is illustrated in the open position P2. In the open position P2, the closure element 32 is lifted off the valve seat 34 because the force of the spring element 36, which is embodied as a soft spring, is overcome by the hydraulic pressure of the filtered fluid. The filtered fluid can thus flow about the closure element 32 into the outlet socket 108 and thus out of the filter system 100.

What is claimed is:

1. A filter system for filtering a fluid, the filter system comprising:
    a filter housing comprising a housing top part and further comprising a housing bottom part, wherein the housing top part and the housing bottom part extend along a housing axis;
    an outlet socket arranged at the housing top part and configured to discharge the fluid after having been filtered;
    a non-return valve having a valve housing mounted and affixed onto a n interior surface of the outlet socket of the housing top part;
    wherein the non-return valve comprises:
        a closure element;
        a spring element supported at the top housing part and acting against the closure element to urge the closure element into a closed position on a valve seat;
        an annular valve holder arranged in the interior of the outlet socket of the housing top part and mounting the valve housing onto an interior surface of the outlet socket of the housing top part, the annular valve holder comprising:
            at least one radially inward projecting web against which the closure element of the non-return valve rests when the filter element is removed from the filter housing;
    a filter element arranged in the filter housing and separating a raw fluid side and a clean fluid side from each other, wherein the filter element comprises:
        a filter bellows arranged about a longitudinal axis of the filter element;
        an end disc arranged on an end face of the filter bellows, the end disc having a central opening configured to drain the fluid after having been filtered from an interior of the filter bellows,
    the filter element further comprises a central tube arranged in the interior of the filter bellows, wherein the central tube comprises the socket of the filter element forming the valve seat at an end of the central tube facing the end disc,
    a socket of the filter element arranged in the filter element and extends in an axial direction along the longitudinal axis of the filter element to open axially outwardly through an interior of the central opening of the end disc;
    wherein the socket of the filter element forms the valve seat of the non-return valve;
    wherein the socket of the filter element projects through the annular valve holder to contact and lift the closure element off of the at least one radially inward projecting web of the annular valve holder when the filter element is arranged in the filter housing;
    wherein the non-return valve closes a fluid path through the outlet socket when in the closed position, and opens the fluid path through the outlet socket when the non-return valve is in an open position.

2. The filter system according to claim 1, wherein the socket of the filter element is an actuating element configured to interact with the non-return valve.

3. The filter system according to claim 1, wherein the spring element is clamped between the closure element and the housing top part.

4. The filter system according to claim 1, wherein the socket of the filter element projects through the annular valve holder when the filter element is arranged in the filter housing.

5. The filter system according to claim 1, wherein leakage openings are formed between the closure element of the non-return valve and the annular valve holder, such that fluid can drain from the outlet socket and bypass the closure element of the non-return valve to empty the outlet socket.

6. The filter system according to claim 1, wherein the valve holder is a bent sheet metal part configured to be radially clamped in the outlet socket.

7. The filter system according to claim 1, wherein the valve housing is arranged in the interior of the outlet socket and/or at the annular valve holder arranged in the interior of the outlet socket, wherein the spring element is supported at the valve housing.

8. The filter system according to claim 7, wherein the valve housing and the annular valve holder are connected to each other.

9. The filter system according to claim 8, wherein the valve housing and the annular valve holder form a one-piece structure.

10. The filter system according to claim 1, wherein the central tube is configured to be insertable at least partially into the outlet socket, wherein the outlet socket is configured to be sealed relative to the central opening of the end disc and/or relative to the central tube.

11. The filter system according to claim 10, wherein an outer side of the socket of the central tube is sealed against the outlet socket.

12. The filter system according to claim 1, wherein the central tube comprises, at an end opposite the central opening, a closure element configured to be connected to the housing bottom part.

13. The filter system according to claim 1, wherein the non-return valve is configured to allow for leakage when the filter element is removed from the filter housing.

14. A non-return valve for the filter system according to claim 1, wherein
the non-return valve is configured to be arranged in the interior of the outlet socket of the filter system, and
wherein the non-return valve comprises
a closure element and further comprises a spring element,
wherein the closure element is supported by the spring element against the valve seat of the filter element;
an annular valve holder comprising:
radially inward extending webs against which the closure element of the non-return valve rests; and
leakage openings are formed between the closure element of the non-return valve and the annular valve holder, such that fluid can drain from the outlet socket and bypass the closure element of the non-return valve to empty the outlet socket.

15. A filter element for the filter system according to claim 1, wherein
the filter element comprises
a filter bellows arranged about a longitudinal axis of the filter element,
wherein the filter element comprises
a socket,
wherein the socket comprises a central opening and is configured to drain the fluid after having been filtered from an interior of the filter bellows,
wherein the socket forms the valve seat of the filter element.

16. The filter element according to claim 15, further comprising
a central tube arranged in the interior of the filter bellows,
wherein the filter bellows comprises
an end disc arranged at an end face of the filter bellows,
wherein the end disc comprises
an opening configured to receive the central tube in the interior of the filter bellows,
wherein the central tube includes a closure element closing the opening of the end disc, wherein an axially outer face of the closure element includes an annular groove configured to receive and engage an axially projecting locking configuration of a filter housing,
wherein the central tube comprises
the socket forming the valve seat at an end of the central tube facing the end disc.

\* \* \* \* \*